June 6, 1961  W. P. PAULIN  2,987,607
AUTOMATICALLY CONTROLLED ELECTRIC KETTLE
Filed June 18, 1959  2 Sheets-Sheet 1

Inventor:
William P. Paulin,
by T G Dysart
His Attorney.

June 6, 1961  W. P. PAULIN  2,987,607
AUTOMATICALLY CONTROLLED ELECTRIC KETTLE
Filed June 18, 1959  2 Sheets-Sheet 2
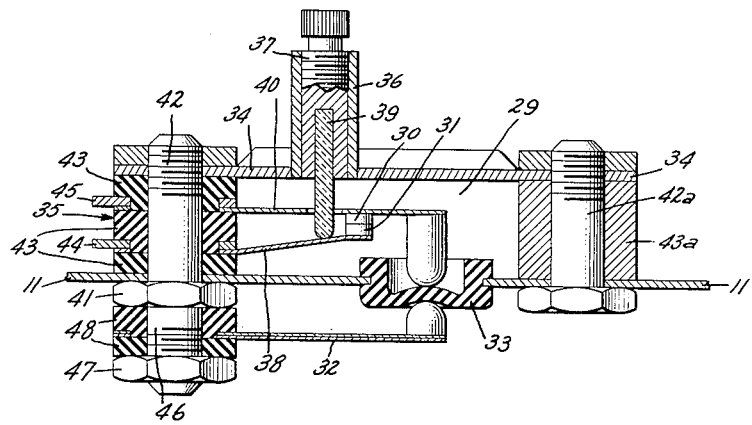
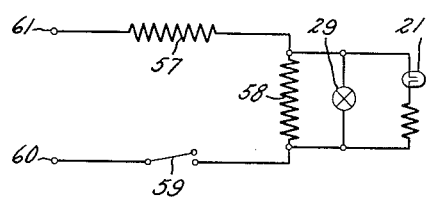
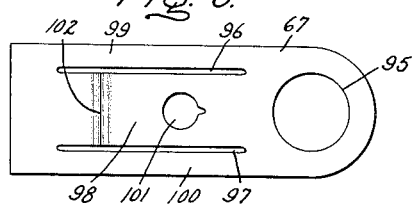
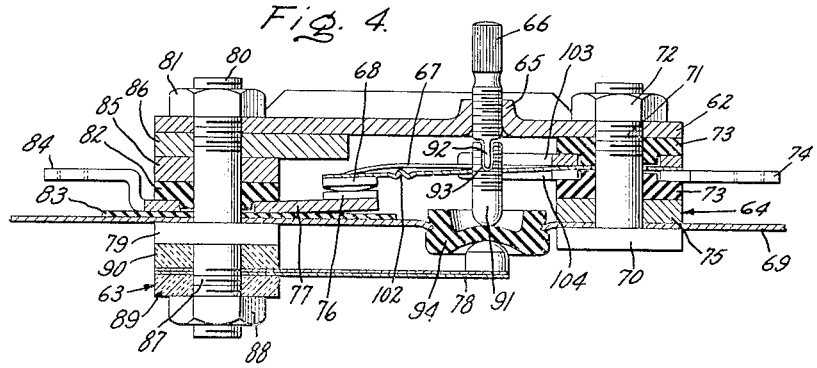
Inventor:
William P. Paulin,
by TGDysart
His Attorney.

United States Patent Office 2,987,607
Patented June 6, 1961

2,987,607
AUTOMATICALLY CONTROLLED ELECTRIC KETTLE

William P. Paulin, Barrie, Ontario, Canada, assignor to Canadian General Electric Company, Limited, Toronto, Ontario, Canada, a corporation of Canada
Filed June 18, 1959, Ser. No. 821,171
9 Claims. (Cl. 219—44)

The invention relates to an electrically heated kettle, and more particularly to an automatically controlled kettle for use in the home.

It is usual in most electrical kettles for the circuit control elements to be placed in a compartment beneath the bottom wall of the water chamber. Consequently, if a thermostatically operated switch is used, the bimetallic strip of this switch may be subjected to the temperature of the water being boiled by means of a probe connected to one end of the bimetallic strip and projecting through the bottom wall into the water. But this design is difficult to manufacture as extreme care is required in its assembly, particularly in achieving a watertight seal between probe and bottom wall. Further the design is inherently susceptible to deposits of lime accumulating on the probe which would falsify the temperature-sensing of the probe after a certain period of time.

A better design is the connection of the bimetallic strip to a clamp securing the heating element having the highest power range to the kettle base which clamp is arranged to extend through the bottom wall of the water chamber to the thermostatic switch. In this way a sensing point for thermal overload detection is provided so that the same bimetallic strip may serve to operate both the thermostatic control switch and the cutout switch. In this design no sealing problems are present and the formation of lime does not affect the accuracy of the temperature sensing of the thermostatic element, but since the heat is transferred to the bimetallic strip at one end only, there is still a thermal delay problem. The heat must travel through the entire strip which delays the action of the strip unduly. Finally, both this arrangement and the arrangement using a probe requires a precise adjustment of the thermostatic switch. This adjustment must be done at the end of the assembly before covering the compartment containing the circuit control elements and cannot be changed afterwards without the removal of a covering device such as a plug button.

It is therefore the object of this invention to provide an improved thermostatically controlled kettle which is free of the aforementioned disadvantages.

It is another object of my invention to provide a thermostatically controlled kettle, wherein the thermostatic element is subjected to the temperature of the steam generated in the kettle.

In carrying out my invention I locate the bimetallic strip of the thermostat within the water chamber so that it is in direct contact with the steam generated by the kettle. In this manner the bimetal is directly exposed over its entire surface to the temperature within the water chamber of the kettle which eliminates the delay in heat transfer so that the bimetal is able to follow rapidly any temperature variations. The potential effect of a lime coating is negligible as only a small accumulation of lime will be deposited on the bimetal from the steam and, in the event of such a formation, the motion of the bimetal will scale off any deposit.

Other objects and further details of that which I believe to be novel and my invention will be clear from the following description and claims taken with the accompanying drawings wherein:

FIG. 2 is an enlarged sectional view showing the thermostatic switch mechanism of the kettle shown in FIG. 1;

FIG. 3 is a circuit diagram showing the connection of the electrical elements;

FIG. 4 is an enlarged sectional view through a modified thermostatically controlled switch, and FIG. 5 is a top view of a part of the switch illustrated in FIG. 4.

Figure 1:
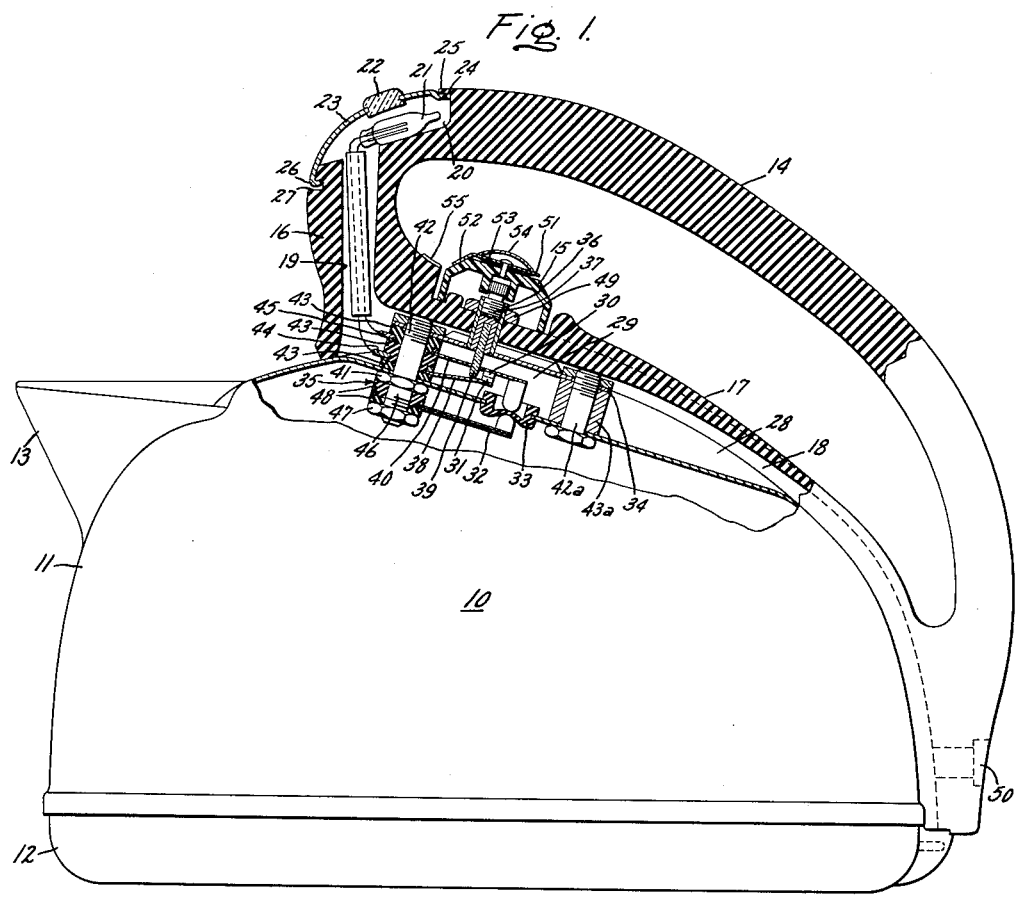
FIG. 1 is a side elevation view of a kettle incorporating my invention and having portions broken away to show underlying parts.

Referring to FIG. 1 the kettle is designated generally by the reference numeral 10 and comprises a water chamber 11, a base 12, a spout 13, a handle 14 and a control knob 15 for adjusting the operation of the kettle. The base 12 is removably secured to the water chamber 11 in any conventional manner and, when secured thereto, it cooperates therewith to form a compartment which, as it is well known, shelters parts of the circuitry such as heating element terminals, cutout switch and others. The handle 14 includes an upright portion 16 extending in a substantially vertical direction and a base portion 17 which is bent along the contour of the surface of the water chamber 11. The underside of base portion 17 is chamfered so that, when the handle 14 is mounted on water chamber 11, a space or tunnel 18 is formed by water chamber 11 and base 17. The upright portion 16 of the handle 14 is provided with a bore 19 which extends throughout the length of upright portion 16 and communicates with the tunnel 18. The top end of bore 19 terminates in a cavity 20 in which a pilot light 21 is located. The cavity is covered by a member 23 of resilient material containing a crystal 22. The member 23 covers the cavity 20 and has at one end a cranked portion 24 of member 23 which slides under a projection 25 provided on cavity 20, and at the other end a portion 26 is bent in at an acute angle with respect to the adjacent part of member 23 and snaps into a groove-like recess 27 in front portion 16.

The top of water chamber 11 is furnished with an external indentation 28 which proceeds substantially in the same direction as the longitudinal axis of the handle 14. A thermostatic switch 29 is disposed in indentation 28 in such a manner that contact members 30 and 31 are located in said indentation while bimetal member 32 is located inside the water chamber 11. In the assembled state the chamfered base 17 of handle 14 covers indentation 28 thereby providing a compartment for the thermostatic switch at the top of the kettle and external thereto. Movements of bimetal member 32 are transmitted to contact members 30 and 31 by means of a flexible membrane 33 inserted in an opening in the top wall of water chamber 11. Membrane 33 may be made from any suitable material that resists temperature and moisture, for instance, silicone rubber and is designed to provide a steamtight seal in the opening.

Thermostatic switch 29 includes a base 34 and a stack 35. The base 34 carries a threaded bushing 36 which is inserted into an aperture of the base and secured therein, for instance, by brazing. A composite adjusting screw 37 is threaded in the bushing 36 and imparts motion to a resilient member 38 through an insulating pin 39 inserted and secured in a central bore of the screw. The resilient member 38 carries a contact 31 which is moved when pin 39 engages the resilient member 38. The member 38 biased in an upward direction is carried in stack 35. Also carried in stack 35 is a second resilient member 40, that carries a contact 30 and is biased in a downward direction so that both members 38 and 40 have the tendency to keep contacts 30 and 31 in a closed position. The stack 35 is held together by a bolt having a head 41 and a shank 42 which bolt also connects the thermostatic switch 29 with the wall of water chamber 11. The head 41 of the bolt is thereby disposed inside the water chamber 11 while the shank 42 projects through an aperture in the water chamber wall and is screwed with its threaded end portion into base 34 which secures the bolt in this position. Insulating washers 43 insulate members 38 and 40 from the bolt, base, and water chamber wall. Terminal lugs 44 and 45 are respectively in electrical contact with members 38 and 40. A second shank portion 46 of the bolt extends beyond head 41 into the water chamber 11 and carries bimetallic strip 32 secured by a nut 47 and insulated from shank portion 46 by insulating washer 48, which serve as thermal insulation for bimetal strip 32. This insulation is provided in order to maintain a small thermal mass connected to the bimetal blade which ensures rapid response of the bimetal member to temperature variations. Variations in the degree of thermal insulation may be used to alter the speed of response of the bimetal member. Finally, the other end of the thermostatic switch 29 is connected to the wall of water chamber 11 by means of a second bolt 42a and a tube-like spacer 43a.

Bushing 36 brazed to base 34 serves also as a means for securing handle 14 to the water chamber 11. For this purpose an end portion of bushing 36 is provided with an outer thread over which a nut 49 is screwed after bushing 36 has passed through an aperture in the base 17 of handle 14. A further securing means is provided at the lower end of handle 14 as is indicated by an aperture 50 which receives an attachment screw.

Knob 15 is connected to the adjusting screw 37 by pressing the knob with its central bore over the knurled end portion of screw 37 which projects out of bushing 36. A dial 51 having an indicator 52 is rotatably mounted on top of knob 15. A friction spring 53, connected to dial 51, prevents motion of the dial when once set. This effect may be improved by adding a detent device, well known in the art, to the dial. Finally a decorative cap 54 covers the dial arrangement. The position of dial 51 may be checked against an index mark 55 located opposite knob 15 on the base 17 of handle 14.

Thermostatic switch 29 and pilot light 21 are connected with the other electrical elements located in base 12 and water chamber 11 in a circuit which is illustrated in FIG. 3. Energy is supplied from a source of 115 volts to the kettle by means of a supply cord having an appliance plug that contacts terminal prongs projecting out of the base compartment 12 and protected by plug guard 56 (see FIG. 1). A heating element 57 having a power range of for instance 1500 watts, a second heating element 58 having a lower power range of for instance 300 watts, and a cut-out switch 59 are connected in series to terminals 60 and 61. Cut-out switch 59 is thermostatically controlled and prevents the kettle from over heating and subsequently burning out the heating elements. Thermostatic switch 29 and pilot light 21 are connected in parallel with heating element 58 so that a closed thermostat will short-circuit heating element 58 and the pilot light.

When the kettle is used for the first time, it is necessary to adjust its thermostatic switch to the boiling point of water which in effect provides for the calibration of the kettle according to the atmospheric pressure at the location in which it is to be used. The kettle needs to be calibrated only once for any one location.

This may be carried out by the user of the kettle as follows. After pouring water in chamber 11 and turning knob 15 to the left as far as possible, the kettle is connected to a source of electrical energy. The turning of knob 15 to the left retracts adjusting screw 37 with insulating pin 39 and allows resilient member 38 to assume its uppermost position thereby taking resilient member 40 to a position in which it cannot be reached by the bimetallic strip 32 at any operating temperature of the kettle. Contacts 30 and 31 remain closed thereby short-circuiting heating element 58 and pilot light 21. Only heating element 57 having a power range of about 1500 watts is connected to the source of electrical energy and rapidly heats up the water in the kettle. When the water starts to boil, knob 15 is turned slowly to the right until pilot light 29 lights up. During the turning of knob 15, adjusting screw 37 with insulating pin 39 moves downwards and presses resilient member 38 downwards. Member 40 which is biased in a downward direction follows the movement of member 38 until it is stopped by the bimetallic strip 32 through membrane 33. Since member 40 is prevented from further downward motion a slight additional turn of knob 15 will force member 38 further down and thereby result in the separation of contacts 30 and 31. The heating element 58 and pilot light 21 are thereby reconnected in circuit. Pilot light 21 is energized and heating element 58 having a power range of about 300 watts is added in series to heating element 57 having a power range of about 1500 watts. This will increase the resistance in the circuit and consequently decrease the total power consumption of both heating elements to about 250 watts which will keep the water in the kettle at a gentle boil. The thermostatic switch 29 now has been adjusted to the boiling point of water and the kettle is ready for operation.

When knob 15 has reached the position in which the pilot light 21 lights up, it is advantageous to give the knob an additional slight turn to the right in order to set the thermostatic switch slightly below the boiling point so that the kettle does not start to cycle up and down about the boiling point. This position of knob 15 may then be marked by turning dial 51 relative to the knob until indicator mark 52 and index mark 55 are aligned.

For automatic operation of the kettle it is then only necessary to check the position of the knob 15 to see that the index mark is aligned with the indicator mark. This will then provide for the operation of the kettle to permit the rapid heating of the water to the boiling point and thereafter for the reduction of heat output in order to maintain the water at a gentle boil. In this position of the knob 15, the contacts 30 and 31 located on resilient members 38 and 40 respectively assume a position that is fixed by insulating pin 39. As both resilient members are biased towards each other, the contacts are firmly closed and only heating element 57 is connected in the electrical circuit of the kettle. This effects a rapid heating-up of the water in water chamber 11 after the kettle has been connected to a source of electrical energy. The increasing temperature in the water chamber during the heating-up period influences the bimetallic strip 32 to bend upwards until it contacts the resilient member 40 through membrane 33. Resilient member 40 is thereby lifted to a position in which contacts 30 and 31 will become separated since resilient member 38, fixed in its position by insulating pin 39, is not able to follow the upward movement of member 40. As soon as the contacts are open, heating element 58 and pilot light 21 will be reconnected in the electrical circuit of the kettle and so the heat output is decreased to about 250 watts which will keep the water in the water chamber at a gentle boil. The kettle will now continue to operate at this reduced wattage for a long period of time to supply boiling water for any purpose or to serve as a vaporizer.

It will be realized that the function of knob 15 is primarily to permit the thermostatic switch to be adjusted to a temperature corresponding to the boiling point of water at the particular geographical location in which the kettle is used. The secondary function of knob 15 is to permit the kettle to be switched from an automatically controlled device to one in which rapid heating is permitted with no automatic switching to a gentle boil. This may be accomplished by turning the knob to the left which provides a constantly closed thermostatic switch. In this case the insulating pin 39 is sufficiently retracted that the bias of resilient member 38 presses resilient member 40 into a position where it cannot be reached by the bimetallic strip 32 regardless of the temperature in the water chamber. Contacts 30 and 31 remain, therefore, closed all the time and permit only heating element 57 having the higher power range to be connected in the electrical circuit of the kettle thereby permitting rapid heating of the water with no automatic switching to a gentle boil. If it is desired to heat the water in the kettle slowly and thereby permit it to come to a gentle boil the knob 15 may be turned to the right which provides a constantly open thermostatic switch. This results in the downward movement of pin 39 which forces resilient member 38 in the same direction. Resilient member 40 attempts to follow resilient member 38 but is finally restrained from further movement by bimetallic strip 32. While knob 15 is in this position contacts 30 and 31 will, therefore, remain apart thereby effectively placing the heating element 58 and pilot light 21 in the electrical circuit of the kettle. As mentioned previously, this reduces considerably the heat output so that the water in the kettle will be heated slowly to a gentle boil. The kettle will then operate as a vaporizer. It is obvious that the two functions may be provided by two different means. For instance, while knob 15 retains the primary function of adjusting the thermostat to the boiling point, the secondary function of switching element 58 in and out of the circuit may be initiated by another switch positioned in the base portion of the kettle.

It is, of course, possible to achieve the same result with a thermostatic switch of different design which may be placed in any one of many different locations of the kettle so long as the bimetallic member is subjected to the steam generated in the kettle. The placing of the contact members outside the influence of the steam prolongs the life time period of the contacts. The contact life can be further increased by providing the thermostatic switch with a snap action.

FIG. 4 is an enlarged view of such a modified thermostatic switch with snap action including a base 62 and two stacks 63 and 64. The base 62 has an extruded aperture 65 provided with inner threads for engagement with a composite adjusting screw 66. The adjusting screw 66 cooperates with and moves a spring member 67 carrying a contact 68. The member 67 itself is carried in the stack 64. It is mounted therein by a bolt which also connects the thermostatic switch with a wall 69, for instance, of the water chamber. Head 70 of the bolt is thereby disposed inside the water chamber while shank 71 projects through apertures in the water chamber wall and base 62. A nut 72 secures the bolt in this position. Insulating washers 73 insulate member 67 from the bolt, base and water chamber wall. A terminal lug 74 is in electrical contact with member 67. A spacer 75 completes stack 64.

Contact 76 placed adjacent to contact 68 is carried by a solid conducting member 77 which is positioned in stack 63 which also supports a bimetallic strip 78. Conducting member 77 and bimetallic strip 78 are secured in the stack 63 by a bolt which also serves as a means of mounting the thermostatic switch to the water chamber wall. Head 79 of this bolt is again disposed inside the water chamber while shank 80 projects through apertures in the water chamber wall and base 62. A nut 81 secures the bolt in this position whereby an insulating washer 82 and an insulating sheet 83 insulate conducting member 77 from bolt, base, and water chamber wall. Conducting member 77 terminates at one end in a terminal lug 84. Spacers 85 and 86 complete stack 63 above wall 69. A second shank 87 extends beyond head 79 into the water chamber and carries bimetallic strip 78 secured by a nut 88 between washers 89 and 90 which provide a thermal insulation for the bimetallic strip.

The composite adjusting screw 66 comprises two parts, an upper metallic part which cooperates with nut 65 and a lower part 91 made of insulating material, preferably ceramic. The metallic part terminates in a flat projection 92 extending across its diameter and engaging with a correspondingly shaped slot 93 in the ceramic lower part 91 extending across the diameter thereof. The lower part 91 provided with outside threads engages an aperture disposed in the spring member 67 and cooperates with the bimetallic strip 78 through a membrane 94 which makes a steamtight connection in an aperture of wall 69.

FIG. 5 shows a top view of this flexible member 67 comprising an aperture 95 through which shank 71 extends when member 67 is placed in stack 64 (FIG. 4). Two slots 96 and 97 are disposed parallel to and a short distance from the longitudinal edges of member 67 forming between them an integral bridge member 98. A pair of narrow strips 99 and 100 are thereby formed along each side of the flexible member 67. Bridge member 98 is provided with an aperture 101 through which ceramic part 91 of adjusting screw 66 projects. The rim of this aperture is bent in a spiral so as to be able to engage the threads of part 91. Bridge member 98 finally is crimped which is indicated at 102 in order to shorten its length and thereby causing a bulging of the narrow strips 99 and 100. It is well known that a spring member so constructed has two positions of stable equilibrium in which it is flexed by pressing bridge member 98 in one or the other direction. To assure that the flexing of spring member 67 is most prominent at its free end where contact 68 is located, the spring member is disposed in stack 64 (FIG. 4) between an upper and a lower clamping member 103 and 104. The portions of each of the clamping members that project from shank 71 inside the thermostatic switch have the form of a U whereby the legs of the U-shaped portions fit above and below the narrow strips 99 and 100 of spring member 67. As the clamping members preferably extend just past the point where ceramic portion 91 of adjusting screw 66 is screwed through aperture 101, the flexing of spring member 67 is restricted to its free end which carries contact 68.

The operation of the kettle having a thermostatic switch according to FIGS. 4 and 5 is exactly the same as described for the kettle arrangement illustrated in FIG. 1. A knob pressed over the knurled end of adjusting screw 66 may be used in the same manner as described before for adjusting the kettle for the use in a particular geographical location, and for switching the kettle from an automatic to a continuously boiling or to a continuously vaporizing device. During the adjustment for automatic performance, bimetallic strip 78 is able to cooperate through membrane 94 with the ceramic portion 91 of screw 66 which is adapted to be moved for a limited amount in axial direction with respect to the metallic portion of adjusting screw 66.

It is obvious that various other modifications may be made with respect to the novel arrangement and it is intended to cover in the appended claims all such modifications as fall within the scope of this invention.

What I claim as new and desire to secure by Letters Patent of the United States is:

1. In an electric kettle provided with a water chamber, an electric heating unit comprising at least two separate heating elements, and thermostatically operated switching means connected in circuit with said heating elements such that the heating elements may be reconnected in the heating circuit to permit automatic operation of the kettle on a selected number of heating elements so as to provide first for the rapid heating of water in the water chamber to the boiling point and then for the reduction of heat output to maintain the water at a gentle boil, said thermostatic switching means having a temperature-sensing means located inside said water chamber, the contact members of said switching means being located outside said water chamber, and a flexible member positioned in the wall of said water chamber to transmit movement of said temperature-sensing means to said contact members.

2. In an electric kettle provided with a water chamber, an electric heating unit comprising at least two separate heating elements, and thermostatically operated switching means connected in circuit with said heating elements such that the heating elements may be reconnected in the heating circuit to permit automatic operation of the kettle on a selected number of heating elements so as to provide first for the rapid heating of water in the water chamber to the boiling point and then for the reduction of heat output to maintain the water at a gentle boil, said temperature-sensing means of said thermostatically operated switching means being located within the water chamber and secured to the wall thereof, the contact members of said switching means being disposed on said wall outside of the water chamber opposite to the sensing means, and a flexible member positioned in the wall of said water chamber to transmit movement of said temperature-sensing means to said contact members.

3. Electric kettle as defined in claim 2 wherein the contact members of said thermostatically operated switching means are disposed in an indentation in the outer side of the wall of said water chamber.

4. Electric kettle as defined in claim 2 wherein said theromstatically operated switching means is provided with snap acting contact members.

5. Electric kettle as defined in claim 3 wherein the indentation in the outer side of the wall of the water chamber is located at the top of said water chamber and is covered by the chamfered base of a handle which is attached to said water chamber wall.

6. In an electric kettle provided with a water chamber, an electric heating unit comprising at least two separate heating elements, and thermostatically operated switching means connected in circuit with said heating elements such that the heating elements may be reconnected in the heating circuit to permit automatic operation of the kettle on a selected number of heating elements so as to provide first for the rapid heating of water in the water chamber to the boiling point and then for the reduction of heat output to maintain the water at a gentle boil, said temperature-sensing means of said thermostatically operated switching means being located within the water chamber and secured to the wall thereof, the contact members of said switching means being disposed on said wall outside of the water chamber opposite to the sensing means in an indentation located at the top of the water chamber, a flexible member positioned in the wall of said water chamber to transmit movement of said temperature-sensing means to said contact members, a handle mounted on said water chamber wall, said handle having a chamfered portion adapted to cover the contact members in said indentation, said thermostatic switching means being provided with an adjusting screw for calibration of said temperature-sensing means, said adjusting screw extending from said thermostatic switching means through an aperture in said handle base.

7. Electric kettle as defined in claim 6 wherein said adjusting screw terminates in a knob provided with a rotatable dial, said dial provided with an indicator mark for alignment with a stationary index mark on said handle base when said thermostatic switching means is set for automatic operation of the kettle.

8. Electric kettle as defined in claim 7 wherein said rotatable dial is provided with a spring frictionally contacting said knob so as to prevent an inadvertent displacement of said dial relative to said knob.

9. Electric kettle as defined in claim 7 wherein said rotatable dial is provided with a detent mechanism so as to prevent an inadvertent displacement of said dial relative to said knob.

References Cited in the file of this patent

UNITED STATES PATENTS

| | | |
|---|---|---|
| 2,025,302 | Olds | Dec. 24, 1935 |
| 2,076,096 | Samuels et al. | Apr. 16, 1937 |
| 2,222,124 | Sherman | Nov. 19, 1940 |
| 2,310,044 | Stevenson | Feb. 2, 1943 |
| 2,519,432 | Brown | Aug. 22, 1950 |
| 2,528,191 | Turner | Oct. 31, 1950 |
| 2,610,284 | Kolisch | Sept. 9, 1952 |
| 2,691,090 | Vischer | Oct. 5, 1954 |
| 2,726,299 | Carlson | Dec. 6, 1955 |
| 2,806,107 | Miklas | Sept. 10, 1957 |

FOREIGN PATENTS

| | | |
|---|---|---|
| 624,587 | Great Britain | June 13, 1949 |
| 755,971 | Great Britain | Aug. 29, 1956 |